No. 741,868. PATENTED OCT. 20, 1903.
G. W. WITTE.
CORN HUSKER AND SHREDDER.
APPLICATION FILED APR. 13, 1903.
NO MODEL. 5 SHEETS—SHEET 4.
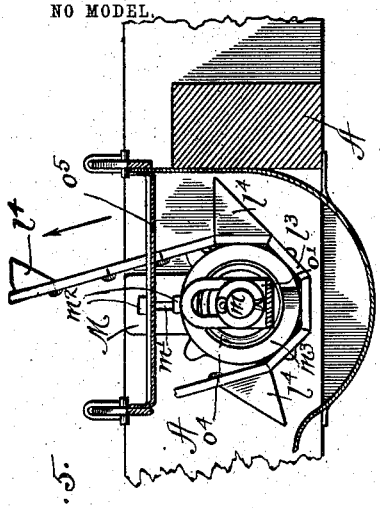
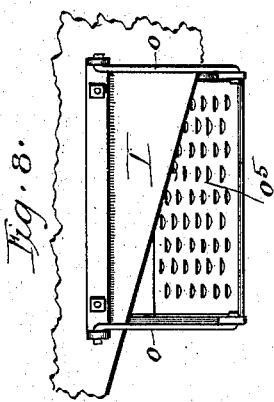
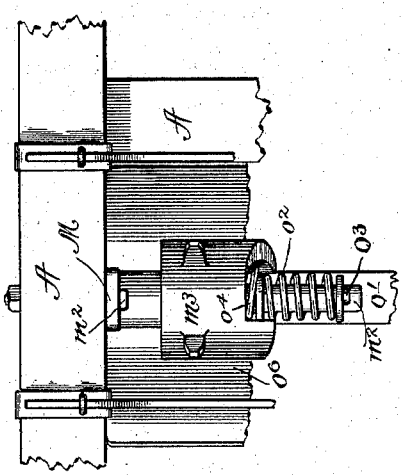
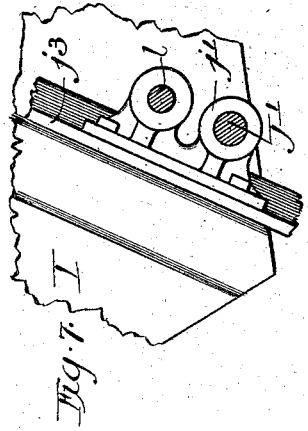
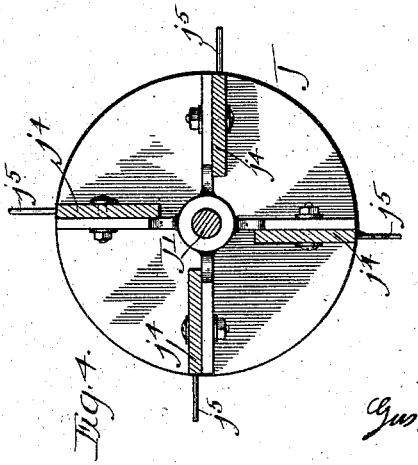
Witnesses
T. H. Alfords.
J. C. Warnes.
Inventor.
Gustav. W. Witte.

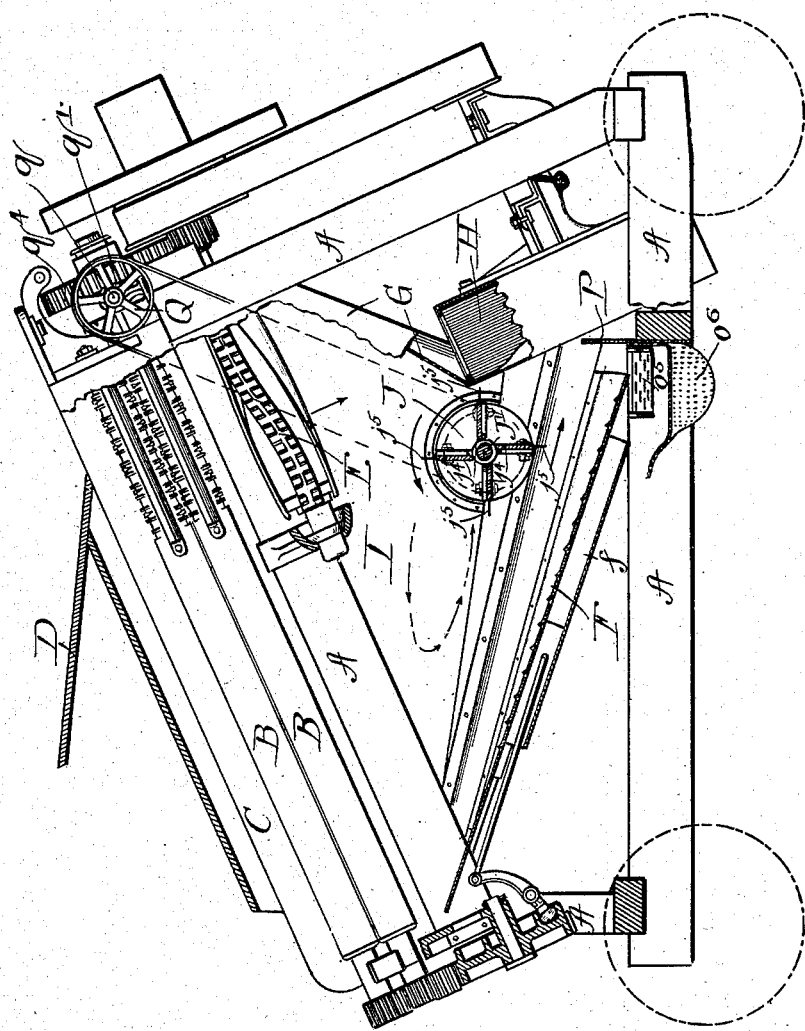

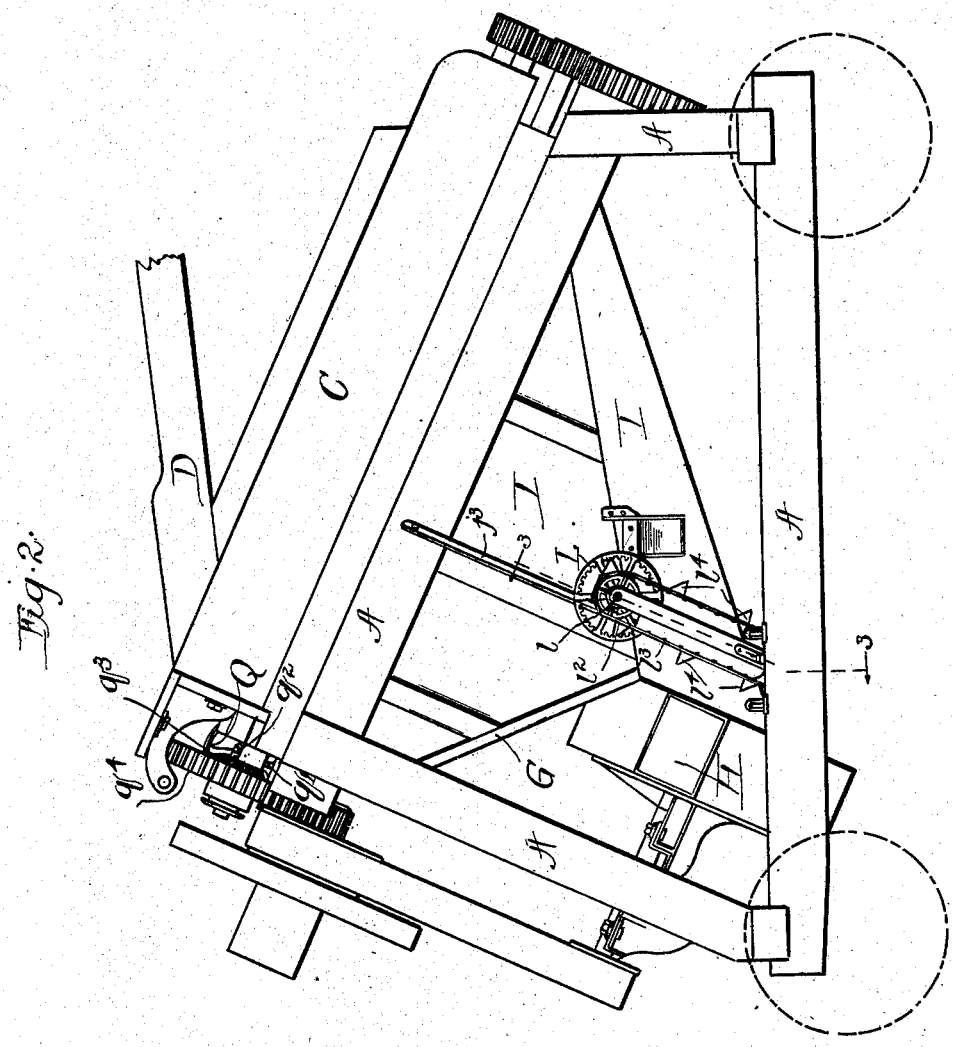

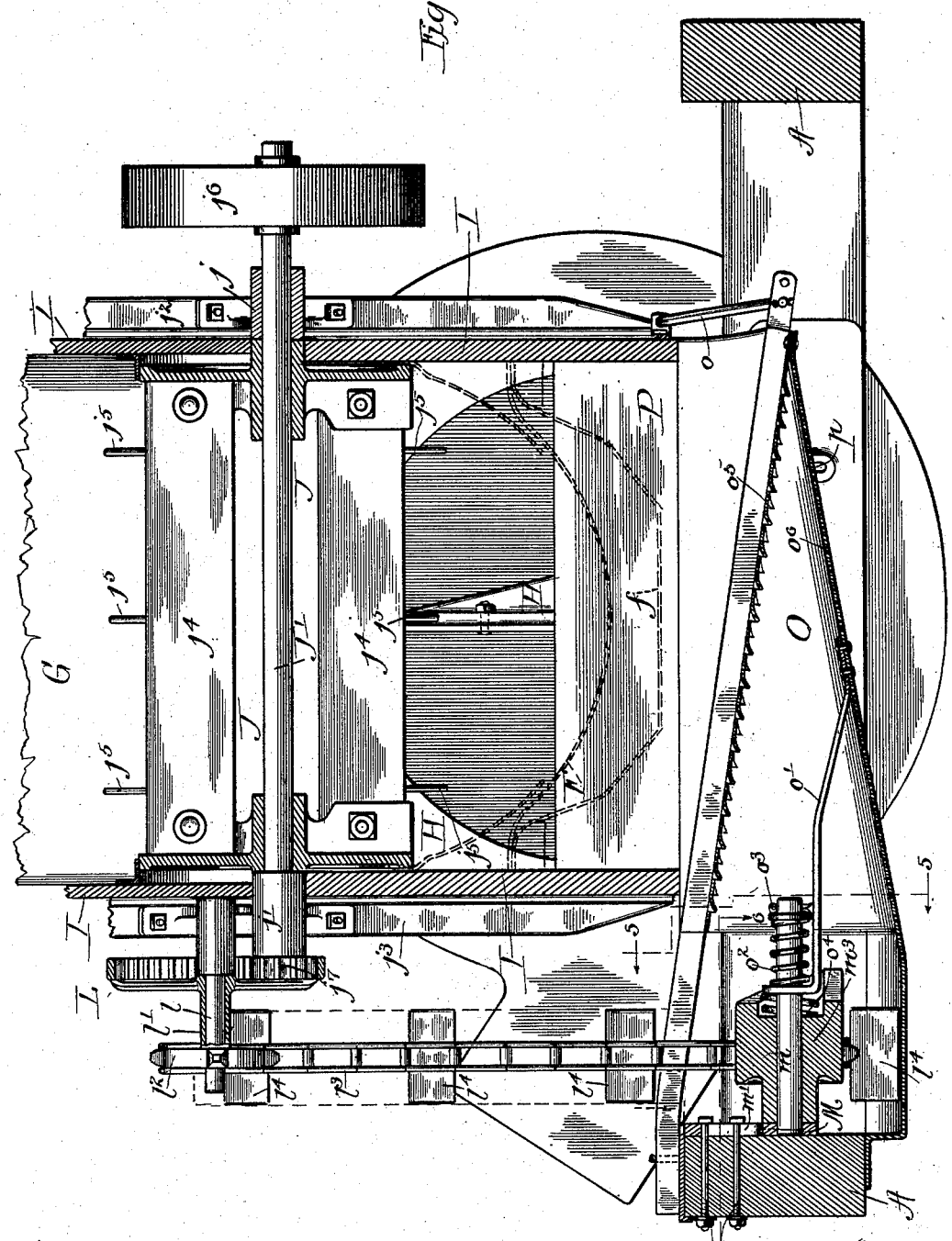

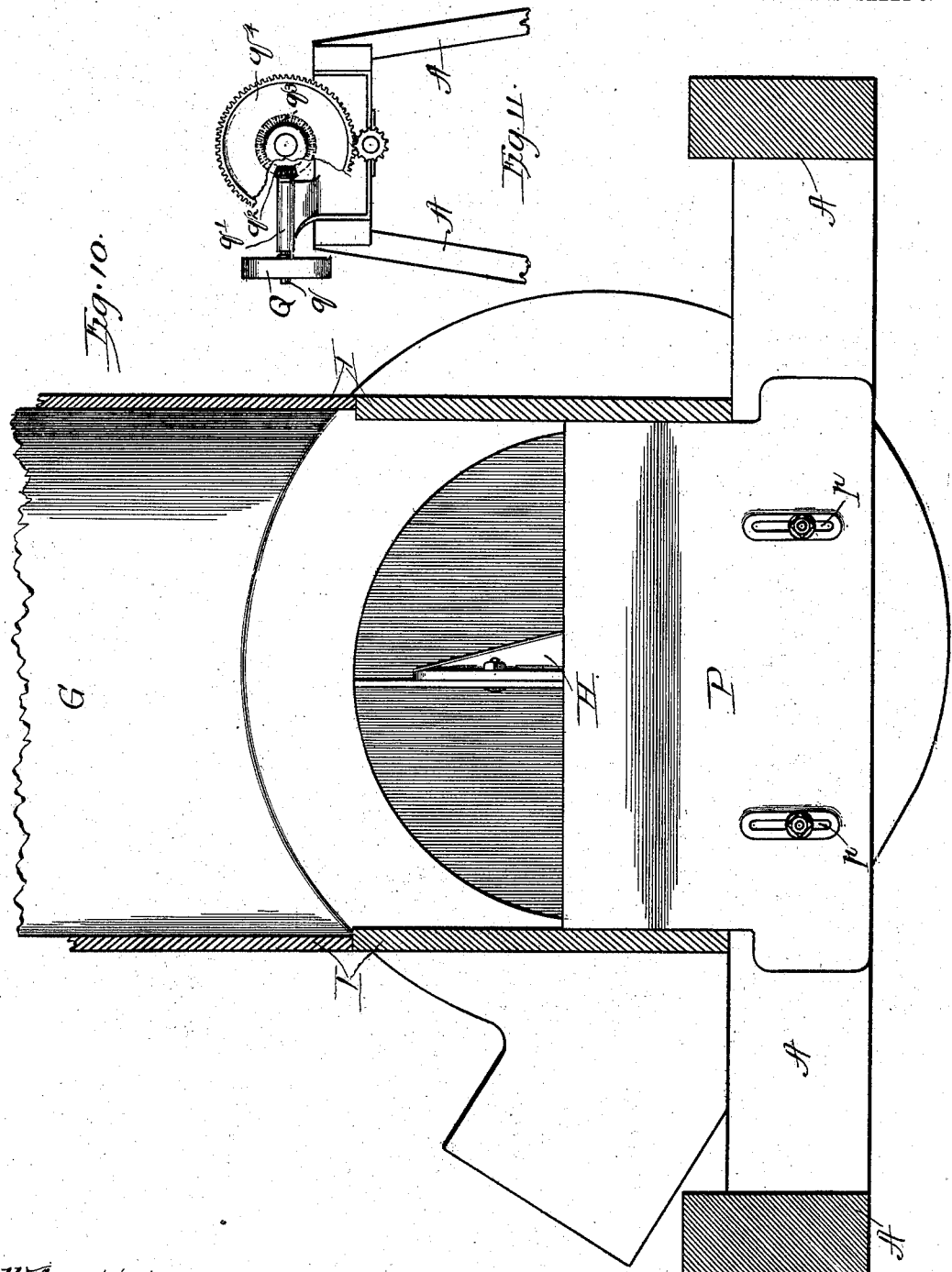

No. 741,868. Patented October 20, 1903.

UNITED STATES PATENT OFFICE.

GUSTAV W. WITTE, OF CHICAGO, ILLINOIS, ASSIGNOR TO INTERNATIONAL HARVESTER COMPANY, A CORPORATION OF NEW JERSEY.

CORN HUSKER AND SHREDDER.

SPECIFICATION forming part of Letters Patent No. 741,868, dated October 20, 1903.

Application filed April 13, 1903. Serial No. 152,473. (No model.)

*To all whom it may concern:*

Be it known that I, GUSTAV WILLIAM WITTE, a citizen of the United States, residing at Chicago, in the county of Cook and State of Illinois, have invented certain new and useful Improvements in Corn Huskers and Shredders, of which the following is a complete specification.

My invention is applicable to any style of husker and shredder, and relates to means for separating the shelled corn from the fodder and also to means for cleaning the shelled corn after being separated. As machines of this class are constructed a varying per cent. of the corn is shelled incident to it being husked and is in most machines precipitated with the shredded fodder upon riddles or other devices provided for separating it from the fodder. This separation is effected with difficulty, as the shredded fodder is thrown down in masses, and thus far satisfactory results have not been attained. The introduction of shredded material in masses upon the corn-separating riddles is due to the fact that entire bunches of fodder are fed into the machine at once.

The object of this invention is to effect a more complete separation of the shelled corn and shredded fodder, and is effected by interposing a beater to operate upon the material as it passes from the shredder-head to the riddles or other cleaning devices.

Referring to the drawings, Figure 1 is a side elevation, partly in section, showing the principal working parts of a shredder and my improvement in connection therewith. Fig. 2 is an elevation of the main portion of the machine viewed from the side opposite to that shown in Fig. 1. Fig. 3 is a transverse section of a portion of the machine, taken on the line 3 3 of Fig. 2, showing the beater, the transversely-disposed supplementary riddle, the shelled-corn elevator, and the position of the lower end of the longitudinally-disposed riddles in dotted lines. Fig. 4 is a transverse section of the beater. Fig. 5 is a sectional view taken on the lines 5 5 of Fig. 3, showing in elevation the lower end of the shelled-corn elevator. Fig. 6 is a plan view of the parts shown in Fig. 5, the chain and cups thereon being omitted in order to more clearly show the cam which actuates the supplementary riddle. Fig. 7 is a fragmentary view adjacent to the upper end of the shelled-corn elevator, showing the casting in which journals one end of the beater-shaft and which also furnishes a bearing for the upper end of the chain elevator. Fig. 8 is an end view of the supplementary riddle. Fig. 9 is a perspective of the cam-actuated arm which operates the cob-separating riddle. Fig. 10 is a partial transverse section showing the adjustable stop which regulates the size of the effective opening of the fan and which also interrupts the free passage of the shredded fodder therein, and Fig. 11 is a detail of the auxiliary driving-shaft and its driving connection.

In the drawings, A designates the main frame of the machine; B, the husking and snapping rollers; C, the side boards inclosing the said rollers, and D the feed-table.

E represents the combined shredder and cutter head, which for brevity will be hereinafter termed the "shredder-head."

F is the longitudinally-disposed riddle, adapted to receive and separate the shelled corn from the shredded fodder.

G is a chute located beneath the shredder-head, and H is the fan. Heretofore the function of this chute G in machines of this type has been to deflect the shredded fodder to the corn-separating riddles and was defective in that it did not distribute the said shredded fodder over the entire length of the riddle, but delivered the greater part of it directly to the fan-opening or within a field subject to the direct suction action of the fan. In this invention, however, the said chute deflects the material to the beater J, which in turn distributes it over the entire length of the riddle F, and it may be added that the interposition of this beater constitutes the chief element of this improvement.

I represents the walls inclosing the space within and above the chute G and the riddle F, thereby forming a triangular inclosure or hopper, the fan being located at what may be considered the lower apex thereof. The chute G and the walls I, I operate to confine the shredded material in a path subject to the action of the beater J; but it is evident that in a different type of machine the shape of this inclosure may differ and one of the wall-forming elements of the inclosure other than the chute G might constitute the chief deflecting member.

A detailed description of the above-mentioned and other parts associated directly or indirectly with this improvement is not essential and for clearness is omitted. For further details of the general construction of the machine to which my improvement is attached reference may be had to Patent No. 575,376, issued to A. Rosenthal January 19, 1897.

The beater J which I have applied is interposed between the shredder-head E and the riddle F and in a position adapting it to operate upon the material delivered from the shredder-head. This beater J is mounted upon the shaft $J'$, (see Fig. 3,) which journals in the bearings $j$ and $j'$, which in turn are secured to the supports $j^2$ and $j^3$, respectively, the said supports $j^2$ and $j^3$ being secured to the upper horizontally-inclined member of the frame A and the walls I of the hopper, as shown in Figs. 2 and 3. The beater consists, preferably, of spiders secured to said shaft $J'$, and to the radial arms of these spiders are bolted the blades $j^4$. Extending radially from the outer edge of the beater-blades $j^4$ I preferably place the pins $j^5$. On one end $J'$ of the beater-shaft is secured the driving-pulley $j^6$, the said pulley being driven by a belt passing around it and the drive-pulley Q. The drive-pulley Q is rigidly mounted upon the transversely-extending auxiliary driving-shaft $q$, which is journaled in suitable bearings $q'$ and driven by the bevel-pinion $q^2$, (see Figs. 2 and 11,) meshing with the bevel-gear $q^3$, preferably integral with the spur-gear $q^4$, which is the main driving-gear of the husking-rollers. On the opposite end of the beater-shaft $J'$ is secured the pinion $j^7$. Integral with the casting $j'$ (see Fig. 3) is a hub-like enlargement, which forms a support for the stud-bearing $l$. On this stud-bearing journals the internal gear L, which meshes with and is driven by the said pinion $j^7$. This internal gear L is provided with a long hub or sleeve $l'$ integral therewith, to which is rigidly secured the sprocket-wheel $l^2$. A casting M is bolted to the inner side of the frame A, this casting being provided with an inwardly-projecting stub-shaft $m$. The casting M is made vertically adjustable relative to the frame A by means of the slot $m'$ and the bolts $m^2$ therein, thereby providing adjustment for tightening the sprocket-chain. On the stub-shaft $m$ journals a sprocket-wheel $m^3$, modified in its construction to form a cam on the inner side thereof. A chain $l^3$, having the cups $l^4$, passes around the sprocket-wheel $l^2$ and engages the sprocket-wheel $m^3$, in this way imparting motion to the elevator-chain and the cam member.

O is a supplementary riddle extending transversely of the machine and located at the lower end of the main riddle F in a position adapting it to receive the shelled corn delivered from said main riddle and free it of fragments of cobs or ears that may occasionally be crushed by the snapping-rollers. This riddle is supported at one end on the vibrating link $o$ and on the other end by the arm $o'$, which has its free end turned to a vertical position and is provided with an aperture therein adapted to engage the stub-shaft $m$. The arm $o'$ is shown in perspective in Fig. 9. A spring $o^2$ is interposed between the outer end of the stub-shaft $m$ and the vertical portion of the arm $o'$, the tendency of this spring being to hold the said arm in engagement with the cam portion of the sprocket-wheel $m^3$. A pin $o^3$ holds the spring on the stub-shaft, and on the stub-shaft is also placed a small coil-spring $o^4$, the function of this latter spring being to take up the shock of the arm $o'$ against the sprocket-wheel $m^3$, caused by the spring $o^2$.

It will be seen from the above description and reference to Fig. 3 that rotation of the sprocket-wheel $m^3$ will press the arm $o'$, and consequently the supplementary riddle, to the right, and on reaching the offset in the actuating-cam the spring $o^2$ will move the riddle in the reverse direction, in this way producing longitudinal vibrations of these parts. The portion $o^5$, being that part provided with apertures through which the shelled corn will drop, slopes downwardly to the right, (see Fig. 3,) while the bottom $o^6$, which catches the shelled corn after dropping through the sieve portion $o^5$ of the supplementary riddle and also the shelled corn passing through the riddle F, slopes downwardly to the left, the effect being to throw the broken cobs and portions rejected by the riddle to the right, while the shelled corn is deflected to the left to a position within reach of the cups of the elevator-chain $l^3$. The shelled corn dropping through the riddle F is caught by the trough $f$ and conveyed to the lower portion $o^6$ of the supplementary riddle, and this portion $o^6$, being provided with numerous small apertures, (see Fig. 1,) will permit the sand to be cleaned from the corn. As the material is delivered from the shredder-head E it will be thrown mainly upon the chute G, from where it will be deflected upon the upper and rearwardly moving portion of the beater. As this beater J rotates at a high speed it will operate to dislodge any of the grains of corn embedded in the mass of shredded fodder by scattering the mass of shredded material along the entire length of the longitudinally-extending riddle F. This riddle F is vibrated by means shown in Fig. 1. In this way the riddle becomes more efficient, since it is effective in its operation upon the mass lodged thereon throughout its entire length. The beater acting upon the fodder passing beneath it to the fan thereby also aids in driving the material into the fan-opening, making the feed thereto uniform and greatly lessening the tendency to choke. The spikes or pins $j^5$, secured to the outer edge of the beater-blades, operate to more thoroughly disentangle the mass and scatter the fodder which passes over it. In order to prevent the suction of the fan and the driving action of the beater from drawing and throwing any shelled corn which does not pass through the sieve in the opening of said fan, an upwardly-projecting plate P is secured near the fan-opening at the lower end of the riddle F and at the forward side of the supplementary riddle O, thus acting as a stop to intercept the free passage to the fan of the shelled corn and shredded material and cause more of the shelled corn to be saved. This stop P is a factor of considerable importance in separating the shelled corn from the fodder, as without it or its equivalent the suction of the fan, aided by the driving action of the beater, would cause the fodder to enter the fan before the shelled corn had been separated from it.

$p$ $p$ are slots in the stop P by which the said stop is made vertically adjustable, and thereby controls the impeding effect of the stop. The action of the stop is such that while it will largely prevent the shelled corn entering the eye of the fan it will, however, allow the blast to draw the lighter or fodder portion up and over the said stop and into the fan. The normal tendency of the stop is to choke the fan; but this tendency is overcome completely by the action of the beater, the lower portion of which introduces the shredded fodder positively and uniformly into the eye of the fan.

What I claim as my invention, and desire to secure by Letters Patent, is—

1. In a corn husker and shredder in combination, shredding mechanism, a fan, a riddle, a rotary beater located near the delivery end of said riddle and in the path of the material operated upon as said material passes from said shredding mechanism to said riddle and a chute for deflecting the shredded material upon the upper portion of said beater substantially as described.

2. In a corn husker and shredder in combination, shredding mechanism, a longitudinally-disposed riddle, a fan located adjacent to the delivery end thereof, a rotary beater extending transversely relative to said shredding mechanism and located in the path of the material operated upon as said material passes from the shredding mechanism to the said riddle, and the chute for deflecting the shredded material upon the upper portion of said beater substantially as described.

3. In a corn husker and shredder, in combination husking and shredding mechanism, a fan, a riddle for separating the shelled corn from the shredded material, a beater interposed between said husking and shredding mechanism and said riddle and in the path of the shredded material passing therebetween, and an adjustable stop located at the lower side of the eye of said fan, said stop adapted to admit the shredded material and to retard the entrance of the shelled corn therein.

4. In a corn husker and shredder, in combination husking and shredding mechanism, a vibrating riddle longitudinally disposed relative to the plane of said husker and shredder, a fan adapted to receive the material to be operated upon from said riddle, a stop located at the lower side of the opening to said fan, a supplementary vibrating riddle extending transversely relative to said first-mentioned riddle, and located between the lower end thereof and the stop in said fan.

5. In a corn husker and shredder in combination, a riddle, a fan located adjacent to the delivery end thereof, shredding mechanism, a rotary beater, both the said shredding mechanism and rotary beater being located above the delivery end of said riddle substantially as described.

6. In a corn husker and shredder in combination, shredding mechanism, a rotary beater placed beneath the said shredding mechanism means for directing the material operated upon from said shredding mechanism to said beater, a longitudinally-disposed riddle having its delivery end immediately below said rotary beater, and a fan located adjacent to the delivery end of said riddle substantially as described.

GUSTAV W. WITTE.

In presence of—
J. C. WARNES,
T. H. ALFREDS.